United States Patent
Na et al.

(10) Patent No.: US 8,291,185 B2
(45) Date of Patent: Oct. 16, 2012

(54) DATA STORING LOCATION MANAGING METHOD AND DATA STORAGE SYSTEM

(75) Inventors: Se-wook Na, Suwon-si (KR); Sang-hoon Lee, Suwon-si (KR); In-sik Ryu, Suwon-si (KR); Hye-jeong Nam, Seongnam-si (KR)

(73) Assignee: Seagate Technology LLC, Cupertino, CA (US)

( * ) Notice: Subject to any disclaimer, the term of this patent is extended or adjusted under 35 U.S.C. 154(b) by 566 days.

(21) Appl. No.: 12/511,992

(22) Filed: Jul. 29, 2009

(65) Prior Publication Data
US 2010/0030987 A1 Feb. 4, 2010

(30) Foreign Application Priority Data
Jul. 30, 2008 (KR) ........................ 10-2008-0074714

(51) Int. Cl.
*G06F 12/00* (2006.01)

(52) U.S. Cl. .................................. 711/165; 711/156
(58) Field of Classification Search .................. 711/167, 711/E12.071
See application file for complete search history.

(56) References Cited

U.S. PATENT DOCUMENTS
6,032,224 A * 2/2000 Blumenau ................. 711/117
6,748,487 B1 * 6/2004 Takamoto et al. ............ 711/113
* cited by examiner

*Primary Examiner* — John Lane
(74) *Attorney, Agent, or Firm* — Hall Estill Attorneys at Law (57) ABSTRACT

A data storing location managing method including generating an access frequency of a storing area accessed in a first storage apparatus according to a command received, copying data stored in the storing area of the first storage apparatus to a storing area of a second storage apparatus when the access frequency of the storing area of the first storage apparatus is greater than a reference value, and replacing location information of the storing area of the first storage apparatus with location information of the storing area of the second storage apparatus.

26 Claims, 10 Drawing Sheets

DATA STORING LOCATION MANAGING METHOD AND DATA STORAGE SYSTEM

CROSS-REFERENCE TO RELATED APPLICATIONS

This application claims priority under 35 U.S.C. §119(a) from Korean Patent Application No. 10-2008-0074714, filed on Jul. 30, 2008, in the Korean Intellectual Property Office, the disclosure of which is incorporated herein by reference in its entirety.

BACKGROUND

1. Field of the Invention

Various embodiments disclosed herein are generally directed to a data storage system, and more particularly, to a method of managing data storage locations of a data storage system.

2. Description of the Related Art

A conventional hard disk drive is usable as a data storage apparatus in a computer operating system to read data from a disk and to write data on the disk using a magnetic head. Although the conventional hard disk drive has a greater storage capacity than a typical semiconductor memory, the conventional hard disk drive has a lower data transmission speed than the typical semiconductor memory.

SUMMARY

Various embodiments disclosed herein are generally directed to data storing location managing methods to manage data storage locations of a data storage system.

Various embodiments disclosed herein generally can also provide a data storage apparatus and a data storage management system to carry out the methods of managing data storage locations.

In accordance with some embodiments, there is provided a data storing location managing method, including generating an access frequency of a storing area accessed in a first storage apparatus according to a command received, copying data stored in the storing area of the first storage apparatus to a storing area of a second storage apparatus when the access frequency of the storing area of the first storage apparatus is greater than a reference value, and replacing location information of the storing area of the first storage apparatus with location information of the storing area of the second storage apparatus.

These and other features which may characterize various embodiments can be understood in view of the following detailed discussion and the accompanying drawings:

DETAILED DESCRIPTION OF THE EMBODIMENTS

The present disclosure generally relates to data storing location managing methods to manage data storage locations of a data storage system.

Figure 1:
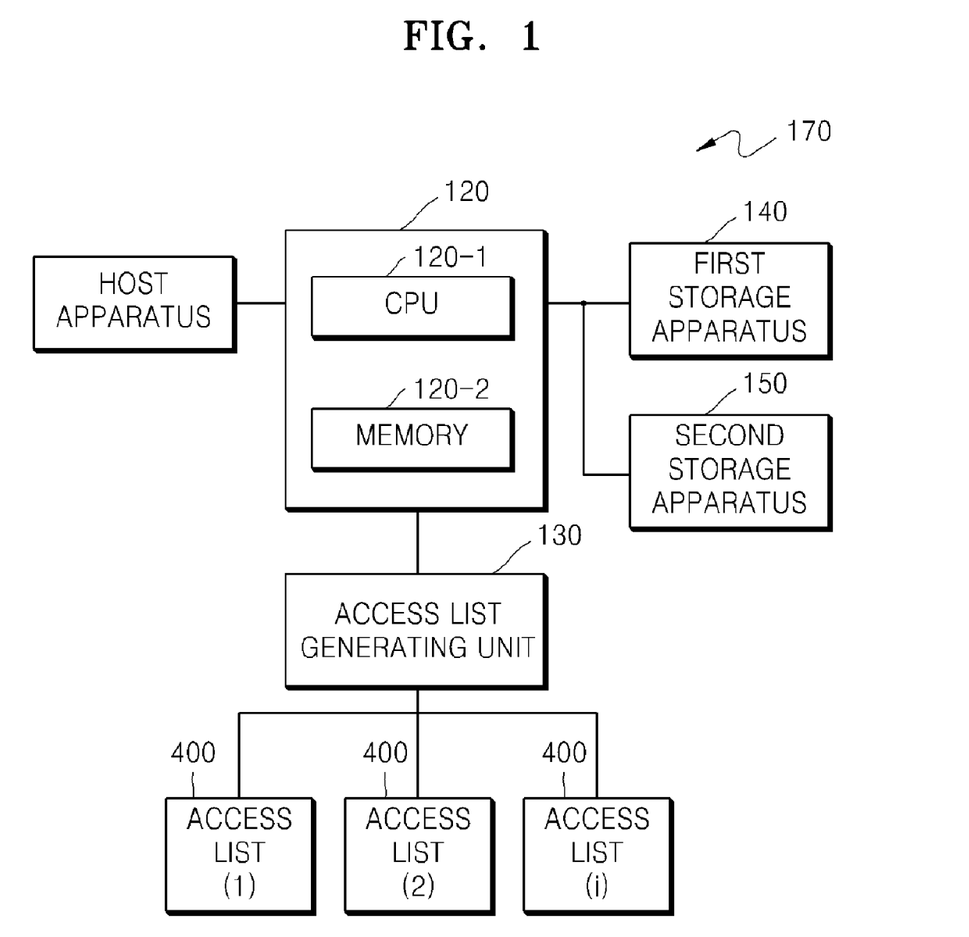
FIG. 1 illustrates a data storage system in accordance with various embodiments.

FIG. 1 illustrates a data storage system in accordance with various embodiments. Referring to FIG. 1, the data storage system 170 can include a host apparatus 110, a controller 120, an access list generating unit 130, a first storage apparatus 140, and a second storage apparatus 150.

The controller 120 can include a central processing unit (CPU) 120-1 and a memory 120-2. The CPU 120-1 of the controller 120 can control operations of the data storage system, and can analyze commands to perform a series of processing, calculating, and comparing operations to analyze data used in the data storage system or computer system. The memory 120-2 can store programs and/or data necessary to control the data storage system and to perform various data management methods. A few example data management methods in accordance with the various embodiments will be described in more detail in conjunction with FIGS. 5-8 below.

Referring to FIG. 1, the first storage apparatus 140 and the second storage apparatus 150 may comprise a nonvolatile memory to permanently store data therein when power is turned off and/or when power is not supplied to the memory. The first storage apparatus 140 and the second storage apparatus 150 may have different methods of reading and writing data. That is, the first storage apparatus 140 may be characterized as a storage apparatus having a larger data storing capacity and/or a slower data writing or reading speed relative to the second storage apparatus 150, and the second storage apparatus 150 may be characterized as a storage apparatus having a lower data storing capacity and/or a higher data writing or reading speed relative to the first storage apparatus 140. For example, the first storage apparatus 140 may be implemented as a hard disk drive (HDD) apparatus, and the second storage apparatus 150 may be implemented as a nonvolatile solid-state semiconductor memory apparatus having a smaller storage capacity than the HDD apparatus-but a faster read/write operation speed than the HDD. Although the various embodiments can implement a HDD apparatus in combination with a solid-state memory device as the first and second storage apparatuses, those skilled in the art will appreciate that other combinations of known or later developed storage apparatuses may also be used as the first and second storage apparatuses without departing from the broader scope and spirit of the disclosure. In addition, although FIG. 1 illustrates the data storage system as including two distinct storage apparatuses, the various embodiments are not limited thereto. It is possible that the first and second storage apparatuses could be combined into a single storage apparatus having different memory areas. For example, the second storage apparatus 150 may be installed inside the hard disk drive. In addition, more than two storage apparatuses could be implemented in the overall data storage system, without departing from the broader scope and spirit of the present disclosure.

In FIG. 1, the access list generating unit 130 can generate or create one or more access lists representing an access frequency of a storing area according to a command performed in the first storage apparatus. The access list generating unit 130, which may also be referred to as an LBA list information block, can generate information data about the most frequently used LBAs. The access list generating unit 130 can generate an access list including frequency information based on the access hit rates by a read and/or write command to the first storage apparatus 140 among the plural storage devices. Based on the access list, when a hit rate of a particular LBA is over a predetermined threshold level, and/or when a predetermined number of different LBAs are included in access list, the controller 120 can cause data to be switched from the first storage apparatus 140 to the second storage apparatus 150, to improve read/write operation speed.

As illustrated in FIG. 1, the access list generating unit 130 can include multiple access lists 400. For example, multiple access lists can be used to represent access frequencies corresponding to multiple programs running simultaneously on the computer system. That is, one access list can correspond to access frequencies of LBAs accessed by a word processing program, and another access list can correspond to access frequencies of LBAs accessed by a spreadsheet program. It is also possible that new access lists can be created to replace old access lists when certain conditions are satisfied, such as when one program is closed and another program is opened, and/or when a predetermined time period has elapsed, and/or when other conditions of the computer system or access list are satisfied. The controller can include a timer to measure the time period between changes to respective hit count fields, and/or the timer can be used in combination with other comparisons of changes in hit counts to establish a condition used to change, or replace, the access lists.

Figure 4:
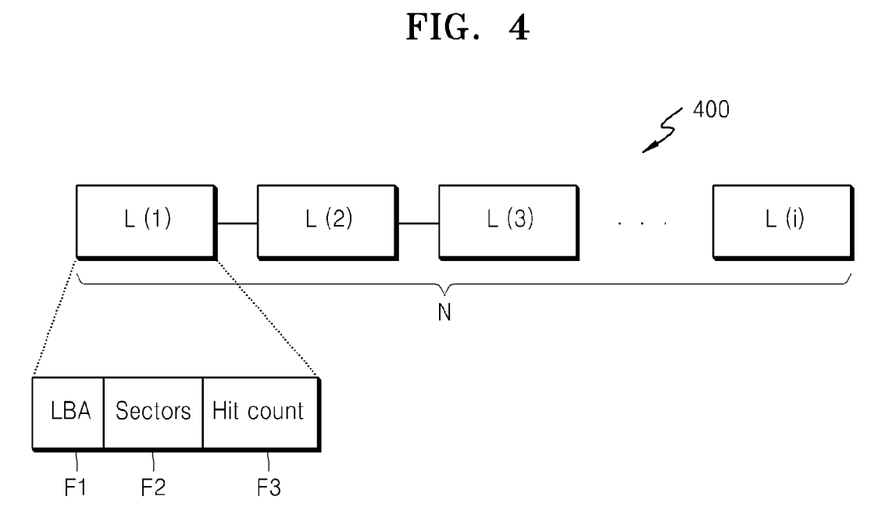
FIG. 4 illustrates an access list generated by an access list generating unit in accordance with various embodiments.

FIG. 4 illustrates an access list 400 generated by the access list generating unit 130. Referring to FIG 4, the access list 400 may include a plurality (N) of unit access information sets L(1) to L(i). As illustrated in FIG. 4, each unit access information set may include a logical block address (LBA) information field F1 representing an access starting location, a sector number information field F2 representing an access area (range), and a hit count information field F3 representing the number of repeated accesses. The unit access information sets may also include additional information fields (not illustrated) as desired, without departing from the principles and spirit of the present disclosure. The number of the unit access information sets allowable in the access list may be set as an initial predetermined value. For example, as illustrated in FIG. 4, the number of unit access information sets is set to four (4).

When the unit access information set including the access area corresponding to the sector number information and the LBA information designated in the command performed in the first storage apparatus 140 exists in the access list generating unit 130, the access list generating unit 130 can increase the hit count information stored in field F3 of the corresponding unit access information. When the unit access information set including the access area corresponding to the sector number information and the LBA information designated in the command performed in the first storage apparatus 140 does not exist in the access list generating unit 130, a new unit access information set can be added to the access list according to the sector number information and the LBA information designated in the command performed in the first storage apparatus 140. Here, the LBA information designated in the command can be stored in the field F1 of the new unit access information set, the sector number information designated in the command can be stored in the field F2 of the new unit access information set, and number one (1) can be stored as an initialized number in the field F3 of the hit count information. In this way, the access list 400 may be used to represent an access frequency of a unit access information set according to a write command and/or a read command.

When the access frequency of the unit access information set according to the access list generated in the access list generating unit 130 is greater than an initially set reference frequency, the CPU 120-1 of the controller 120 can copy data stored in a storing area of the corresponding unit access information set of the first storage apparatus 140, and the copied data can be stored in an auxiliary area of the second storage apparatus 150 which does not typically store data, or in an area which is available to store data. The controller 120 can generate a location information mapping list representing replacement of information on the storing area of the first storage apparatus 140 corresponding to the copied data, with information on the storing area of the second storage apparatus 150 storing the copied data. The controller 120 may store the location information mapping list in the memory 120-2.

Figure 2:
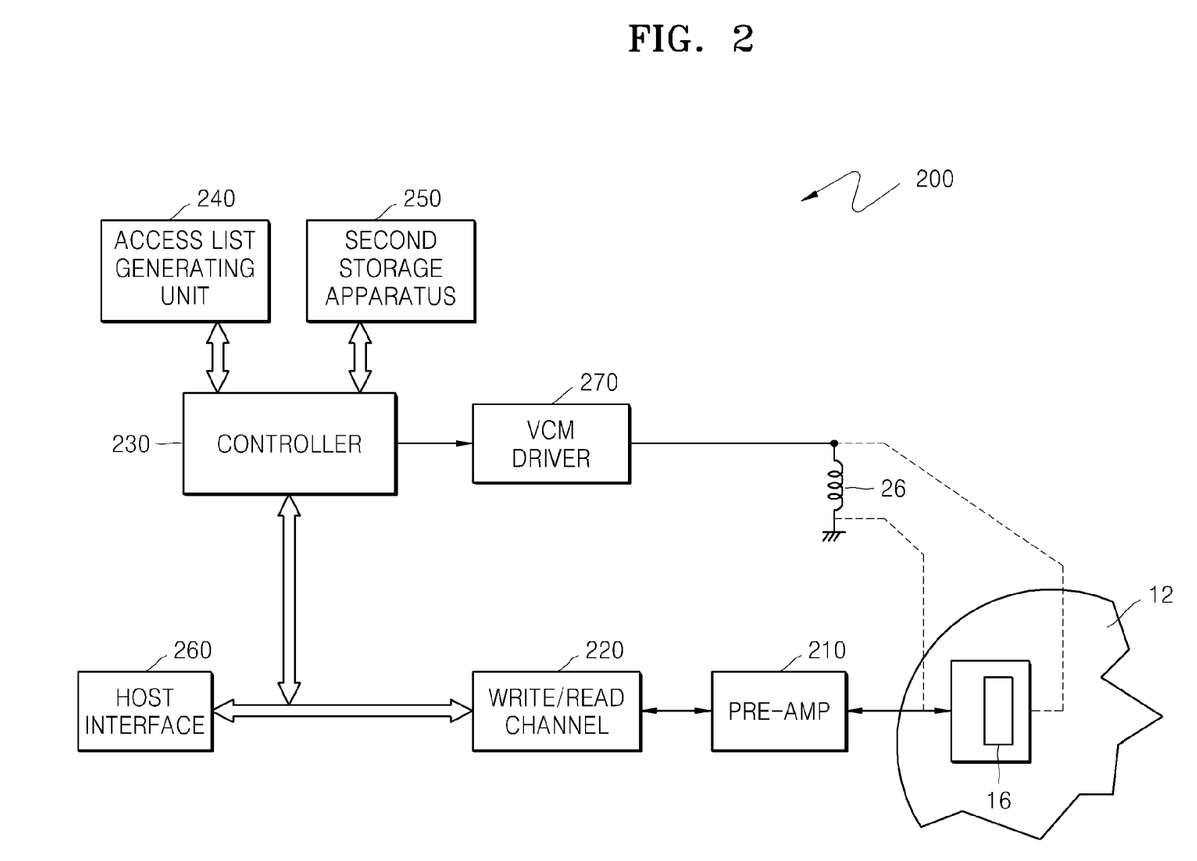
FIG. 2 illustrates a hard disk drive assembly in accordance with various embodiments.

FIG. 2 illustrates a hard disk drive assembly 200 in accordance with various embodiments. As illustrated in FIG. 2, the hard disk drive assembly can include a pre-Amp 210, a write/read channel 220, a controller 230, an access list generating unit 240, a second storage apparatus 250, a host interface 260, and a voice coil motor (VCM) driver 270.

The second storage apparatus 250 may be a nonvolatile memory having an access speed higher than the hard disk drive. For example, the second storage apparatus 250 may be a flash memory, a phase change Ram (PRAM), a ferroelectric Ram (FRAM), a magnetic RAM (MRAM), or other known or later developed nonvolatile memory device.

Although FIG. 2 illustrates the second storage apparatus 250 installed in the HDA 200, it is possible that second storage apparatus 250 can be detachably attached to the HDA 200 through the host interface 260. It is also possible the second storage apparatus 250 can be connected to controller 120 of FIG. 1, and that HDA 200 can be connected to controller 120 of FIG. 1.

One or more disks 12 can be used as a storage medium of the hard disk drive, and each are assigned with one or more logic block addresses (LBAs). A storage medium of the second storage apparatus can also be assigned with the LBAs. However, it is understood that the second storage apparatus 250 may have a different location identifier than the LBAs to provide information about the storing area of the second storage apparatus 250. As such, the LBAs of the first storage apparatus may not be assigned to the second storage apparatus 250.

Referring to FIGS. 2 and 4, the access list generating unit 240 can generate an access list 400 representing access frequencies to correspond to respective storing areas (access areas) of the disks 12 according to one or more commands to access the disks 12 received through the host interface 260, for example, read/write commands. As illustrated in FIG. 4, the access list 400 can include one or more unit access information sets L(1) to L(i). The unit access information sets may include an LBA information field F1 representing an access staring location, a sector number information field F2 representing an access range, and a hit count information field F3 representing a repeated access frequency.

When the access list includes the unit access information set including a storing area corresponding to the sector number information and LBA information designated by the command to access the disk 12, the access list generating unit 240 can increase the hit count information stored in the corresponding hit count information field F3. When the access list does not include the unit access information set including a storing area corresponding to the sector number information and LBA information designated by the command to access the disk 12, the access list generating unit 240 can add to the access list a new unit access information set based on the sector number information and LBA information designated by the corresponding command. In this case, the field F1 of the new unit access information set can store LBA information designated in the command, the field F2 thereof can store the sector number information designated in the command, and the field F3 thereof can store the hit count information, which may, for example, be initialized as one (1).

Referring to FIG. 2, the controller 230 can control operations of the hard disk drive assembly 200. The controller 230 may be implemented in the form of a digital signal processor (DSP), a microprocessor, a microcontroller, or the like, but is not limited thereto. The controller 230 can control the write/read channel 220 to read information (data) from the disk 12 or to write information (data) on the disk 12 according to a command received from a host apparatus connected to the hard disk drive through the host interface 260.

The controller 230 can be connected to the VCM driver 270 to supply a driving current to the voice coil 26. The controller 230 can supply a control signal to control the converter 16 to move with respect to the disk, and to control the voice coil motor to operate the voice coil.

The controller 230 can determine whether the access frequency of at least one of the unit access information sets included in the access list generated from the access list generating unit 240 reaches or is greater than a first critical value (for example, an initially set reference access frequency), can copy data stored in the storing area (access area) corresponding to the LBA designated in the corresponding unit access information set to the second storage apparatus 250, and can generate a location information mapping list to replace the location information of the storing area of the disk 12 of the hard disk drive 240 with the location information of the storing area of the second storage apparatus 250.

According to the location information mapping list, the LBA assigned to the storing area of the disk 12 with the higher access frequency can be reassigned to the storing area of the second storage apparatus 250, using the LBA or a different location identifier of the second storage apparatus 250.

Hereinafter, operations of a read mode and a write mode of a hard disk drive according to example embodiments will be described with reference to FIG. 2.

In the read mode operation of the hard disk drive, when a read command is received, the controller 230 can determine whether one or more LBAs designated in the read command are assigned to the second storage apparatus 250 or the disk 12.

When the designated LBA is assigned to the second storage apparatus 250, the controller 230 can read data stored in the storing area (access area) corresponding to the LBA of the second storage apparatus 250, and can transmit the read data to the host apparatus through the host interface 260.

However, when the designated LBA is assigned to the disk 12 (e.g., first storage apparatus 140), the controller 230 can determine whether the LBA corresponding to the read command is an LBA included in the location information mapping list.

When the designated LBA is included in the location information mapping list, the controller 230 can read the data from the storing area of the second storage apparatus 250 according to the mapping information of the corresponding LBA (without accessing the disk 12), and can transmit the read data to the host apparatus.

When the designated LBA is not included in the location information mapping list but assigned to the disk 12, the controller 230 can control the converter 16 to move the storing area corresponding to the LBA designated according to the read command such that the converter 16 can detect a signal from the corresponding storing area of the disk 12 and the detected signal can be amplified in the pre-Amp (pre amplifier) 210 to generate a signal suitable for a subsequent signal processing. The write/read channel 220 has a circuit to perform a coding operation to code the amplified signal into a digital signal and convert the digital signal into a data stream to be transmitted to the host apparatus.

During or after the read command is performed, when the data is read from the disk 12, the controller 230 can determine whether the unit access information set representing the access area (storing area) of the sector number information and the LBA information designated in the read command can be included in the access list. When the access list does not include the unit access information set representing the access area (storing area) of the sector number information and the LBA information designated in the read command, a new unit access information set based on the read command can be created (generated) and added to the access list. When the access list includes the unit access information set representing the access area (storing area) of the sector number information and the LBA information designated in the read command, the hit count information of the unit access information set can be changed or increased. Such a method of adding new unit access information sets to the access list and/or increasing the hit count information of existing unit access information sets can be referred to as a "hot" hit-rate method, that is, new unit access information sets can be added to the access list or hit count fields of existing unit access information sets can be increased when a particular LBA is frequently requested, or "hot."

Referring again to FIG. 2, in the write mode operation of the hard disk drive, when a write command is transmitted or received, the controller 230 can determine whether the LBA corresponding to the received write command is included in or assigned to the second storage apparatus 250 or the disk 12.

When the LBA corresponding to the received write command is included in or assigned to the second storage apparatus 250, the controller 230 can control the second storage apparatus 250 to store or write data in one or more storing areas (access areas) of the second storage apparatus 250 corresponding to the write command. The data may be transmitted or received through the host interface. It is possible that the data may be stored in a storing area of the hard disk drive or may be generated from a component of the hard disk drive assembly 200.

When the LBA corresponding to the received write command is included in or assigned to the disk 12, the controller 230 can determine whether the corresponding LBA is an LBA included in the location information mapping list.

When the corresponding LBA is an LBA included in the location information mapping list, the data can be stored or written in a storing area of the second storage apparatus 250 which can be mapped with the LBA according to the mapping information of the location information mapping list.

When the corresponding LBA is not an LBA included in the location information mapping list and the LBA designated in the write command is assigned to the disk, the controller 230 can control the converter 16 to move to a storing area of the disk 12 corresponding to the LBA designated according to the write command such that the data received through the host interface 260 is converted into a binary data stream suitable to a write channel in the write/read channel 220 to be amplified in the pre-Amp 210 as a write current to be stored or written on the disk using the converter 16.

The access list can be designed to have access frequencies performed according to all read commands and write commands. However, it is possible that the access list can be designed to include access frequencies performed according to at least one of the read commands or the write commands.

When the access list is designed to include the access frequencies according to the read commands in the hard disk drive, the access frequencies according to the write commands may not be included in the access list.

However, when the hard disk drive is designed to include the access frequencies according to the write command in the access list, the controller 230 can control an access list generating unit as follows.

During or after performing a write command to write data on the disk 12, when it is determined that the access list does not include the unit access information set including the access area corresponding to the sector number information and the LBA information corresponding to the write command, a new unit access information set can be generated according to the write command, and the generated new unit access information set can be added to the access list. When the access list includes the unit access information set including the access area corresponding to the sector number information and the LBA information corresponding to the write command, the hit count information of the corresponding unit access information set can be increased.

When the read mode or the write mode is performed in the hard disk drive, the controller 230 can determine according to the access list generated from an access list generating unit whether the access frequencies of the access list reaches or is greater than a critical value, and if so, can copy the data stored in the storing area (access area) of the disk 12 to the second storage apparatus 250. The controller 230 can generate a location information mapping list to replace the location information of the storing area of the disk 12 with the location information of the storing area of the second storage apparatus 250. The location information mapping list can include information to move at least one LBA having a higher or highest access frequency among the LBAs assigned to the disk 12, to the second storage apparatus 250.

Figure 3:
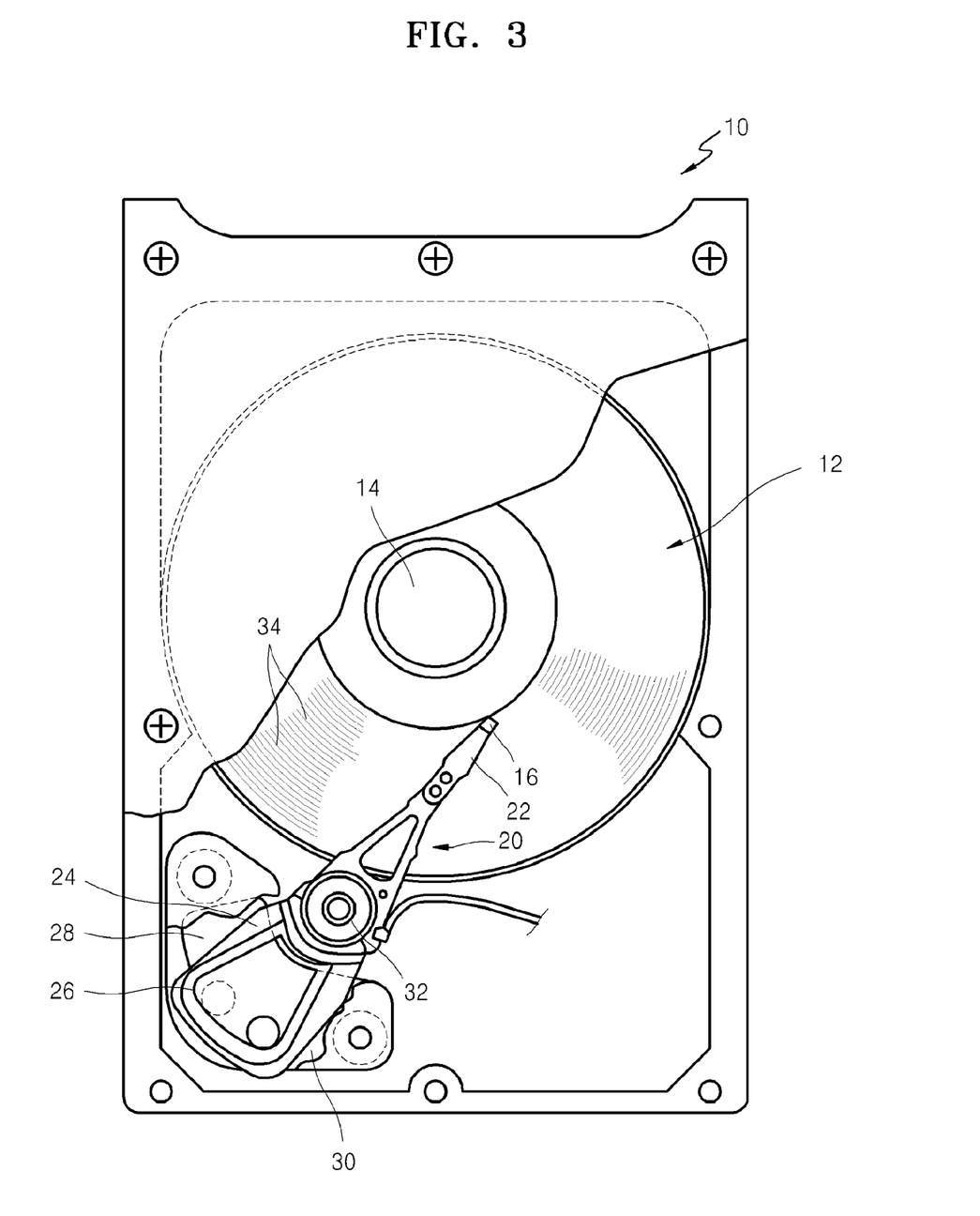
FIG. 3 illustrates a head disk assembly (HDA) of the hard disk drive assembly of FIG. 2.

FIG. 3 illustrates a head disk assembly (HDA) 10 of the hard disk assembly 200 of FIG. 2, in accordance with various embodiments.

The HDA 10 can include at least one disk 12 rotatable by a spindle motor 14. The disk 12 may be a magnetic disk. The HDA 10 may also include a converter 16 disposed adjacent to a surface of the disk 12.

The converter 16 can write or read data on or from the disk by magnetizing the disk or detecting a magnetic field. The converter 16 may be a single converter. However, the converter 16 may include a plurality of converters. For example, one or more converters may be used to magnetize the disk to write data to the disk, and one or more other converters may be used to detect a magnetic field from the disk to read data from the disk. The converter 16 may be implemented in the form of a magneto-resistive element. For purposes of the present disclosure, the converter 16 may be referred to as a head.

Referring to FIG. 3, the converter 16 may be combined with a slider 20. The slider 20 may have a structure to generate an air bearing between the converter 16 and the disk 12. The slider may be combined with a head jimbal assembly 22. The head jimbal assembly 22 may be mounted on the actuator arm 24 with a voice coil 26. The voice coil 26 can be disposed adjacent to the magnetic assembly 28 to correspond to a voice coil motor VCM 30. Current supplied to the voice coil 26 can be used to generate a torque to rotate the actuator arm 24 with respect to the bearing assembly 32. The actuator arm 24 can rotate to control the converter 16 to move with respect to the disk 12 or to traverse tracks 34 of the disk.

According to various embodiments, information or data can be stored or written on tracks 34 of the disk 12. The tracks 34 may be an eccentric track. Each track 34 can include a plurality of sectors. Each sector can include a data field and an identification field. The identification field can include one or more Gray codes to identify sector and track (cylinder). One or more storing areas (access areas) of the disk 12 may be assigned with LBA information. The LBA information can be converted into cylinder/head/sector information to designate the storing area of the disk 12. The converter 16 can move across the surface of the disk 12 to write or read data from different tracks 34.

Figure 5:
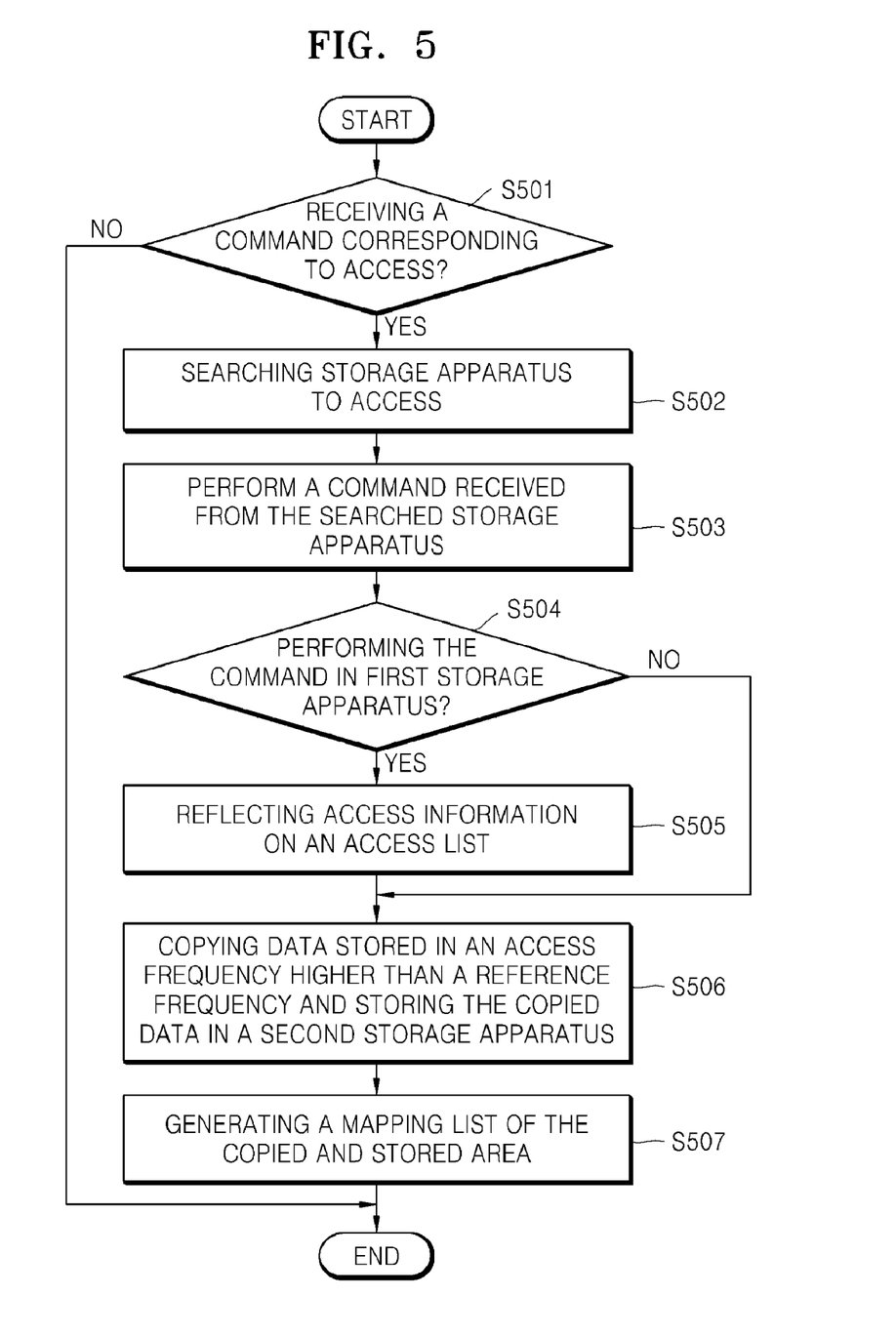
FIG. 5 illustrates a method of managing a data storage area in accordance with various embodiments.

FIG. 5 illustrates a method of managing a data storing area according to a control of the controller 120.

Referring to FIGS. 1 and 5, the host apparatus 110 can generate a command, and the controller 120 can receive the command from the host apparatus 110. The CPU 120-1 of the controller 120 can analyze the command to determine whether the received command is a command corresponding to access data at operation S501. The command corresponding to the access may include a write command and/or a read command.

When the received command is a command corresponding to an access at operation S501, the CPU 120-1 can search or detect one or more storage apparatuses to access at operation S502. The CPU 120-1 can search or retrieve to determine whether a location of a storing area corresponding to the sector information and LBA information designated by the received command is included in at least one of the one or more storage apparatuses. The CPU 120-1 may use a location information mapping list stored in the memory 120-2 when searching the storage apparatuses. That is, the CPU may determine whether the LBA information to be accessed is assigned to a storing area of the first storage apparatus 140 or a storing area of the second storage apparatus 150. When the CPU determines that the LBA information to be accessed is assigned to a storing area of the second storage apparatus 150, the second storage apparatus 150 can be determined as the storage apparatus to access. However, when the CPU determines that the LBA information to be accessed is assigned to a storing area of the first storage apparatus 140, it can be determined that the corresponding LBA information is included in the location information mapping list. For example, in the various embodiments, the location information mapping list may be a list usable for a mapping process to move an LBA having a high access frequency among LBAs assigned to the first storage apparatus 140 to the second storage apparatus 150.

In a case where the LBAs are assigned to storing areas of the first storage apparatus 140 and where LBAs are not assigned to the storing areas of the second storage apparatus 150, it is possible that the CPU 120-1 can determine the second storage apparatus 150 as the storage apparatus to access the data when the location information mapping list includes the LBA information to access. It is also possible that the CPU 120-1 can determine the first storage apparatus 140 as the storage apparatus to access the data when the location information mapping list does not include the LBA to access.

The received command can be performed with respect to the storing area of the determined storage apparatus to be accessed at operation S503. When the received command is a write command, a write operation can be performed to write data with respect to a storing area corresponding to the LBA designated by the write command in the storage apparatus to be accessed. Likewise, when the received command is a read command, a read operation can be performed to read data with respect to a storing area corresponding to the LBA designated by the read command in the storage apparatus to be accessed.

Referring to FIG. 5, when the received command is performed at operation S503, it can be determined whether the storage apparatus on which the command has been performed is the first storage apparatus at operation S504.

When it is determined at operation S504 that the command has been performed in the first storage apparatus, the access information on the command can be added to the access list 400. The access list 400 may have a structure as illustrated in FIG. 4. For example, when it is determined that a particular unit access information set L(1) to L(i) including an access area according to the sector number information F2 and LBA information F1 designated by the command performed in the first storage apparatus exists in the access list 400, the hit count information of the particular unit access information set can be increased. However, when the unit access information set including an access area according to the sector number information and LBA information designated by the command performed in the first storage apparatus does not exist in the access list, a new unit access information set including an access area according to the sector number information and LBA information designated by the command performed in the first storage apparatus can be added to the access list, and the hit count information can be set to a predetermined value, for example, one (1), as an initial value.

Referring again to FIG. 5, when the access frequency of the corresponding unit access information set is greater than a predetermined reference value, a copying and/or storing operation can be performed at operation S506 to copy data stored in the designated storing area corresponding to the unit access information set and to store the data in a storing area of the second storage apparatus in which data is typically not stored, or in an area which is available to store data. That is, when the number of unit access information set included in the access list reaches a first critical value, the CPU 120-1 can copy data stored in a storing area of the first storage apparatus designated by the unit access information set of which hit count information is greater than a second critical value among unit access information sets included in the access list, and can store the copied data in the second storage apparatus of which access speed is higher than the first storage apparatus. Here, the first critical value and the second critical value may be determined as predetermined values according to design characteristics of the data storage system, and the values may be calculated to be suitable for various data storage systems. For example, the first critical value can mean a predetermined number of different unit access information sets are included in the access list, and the second critical value can mean the number of hit counts corresponding to a particular unit access information set. Thus, when a hit rate of a particular LBA is over a predetermined threshold level, and/or when a predetermined number of different LBAs are included in access list, the controller 120 can cause data to be switched from the first storage apparatus 140 to the second storage apparatus 150, to improve read/write operation speed.

The data stored in a designated storing area of the first storage apparatus corresponding to the unit access information set can be transmitted to a storing area of the second storage apparatus, so that the data can be accessed more quickly from the second storage apparatus.

A location information mapping list with respect to the storing area in which the copied data is stored can be created or generated at operation S507. That is, the CPU 120-1 can perform a mapping process of mapping location information assigned in the first storage apparatus corresponding to the LBA of the copied data, with location information on the data stored in the second storage apparatus, so as to generate a mapping list. The mapping list can be stored in the memory 120-2.

Accordingly, a "hot" LBA having a relatively high access frequency which is assigned to the first storage apparatus can be moved or changed to the second storage apparatus having a higher access speed so as to improve the access speed of the data storage system.

A data storing area (location) managing method will be explained hereinafter with respect to a write mode and a read mode.

In accordance with various embodiments, an access frequency list may be generated according to an access frequency of data performed by the read command and the write command, and an access frequency performed according to at least one of the write command and the read command.

Figure 6:
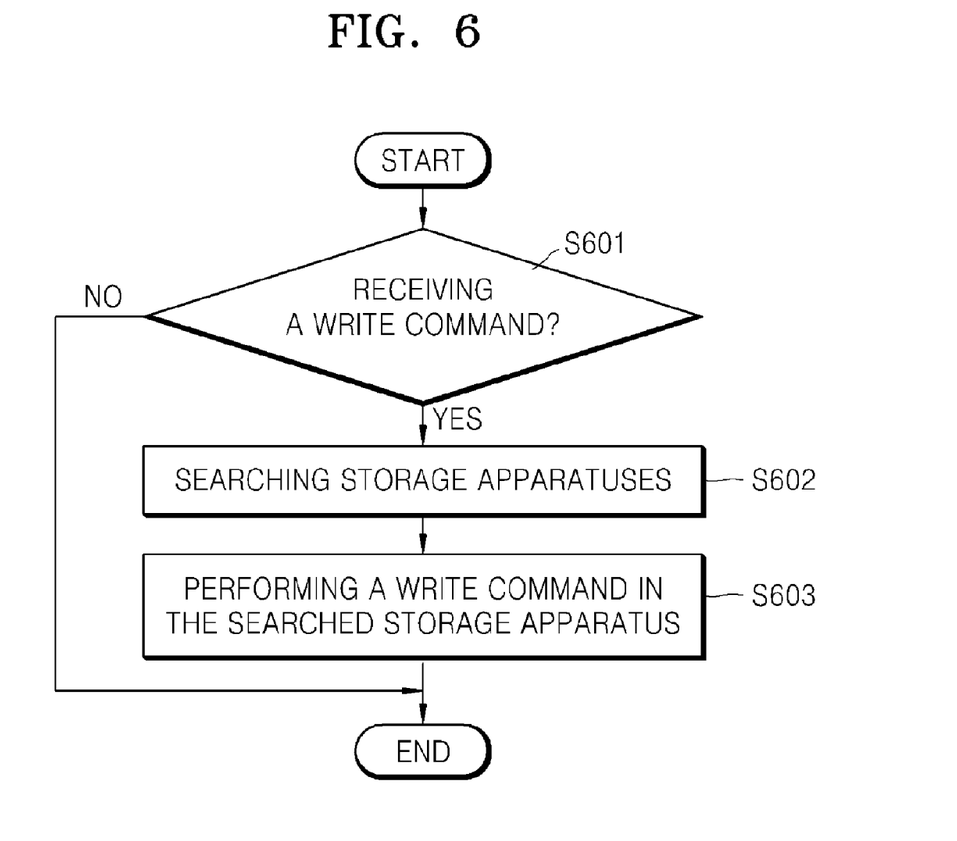
FIG. 6 illustrates a method of generating an access list in accordance with various embodiments.

FIG. 6 illustrates write command performing method according to a searching operation of the storage apparatuses.

Referring to FIG. 6, when a command is received from the controller 120 from the host apparatus 110, the controller 120 can analyze the command to determine whether the received command is a write command, at operation S601.

When the received command is a write command according to a result of operation S601, the CPU 120-1 can search a storage apparatus assigned with LBAs according to the sector number information and LBA information assigned by the write command at operation S602. That is, it can be determined whether the storing area to be accessed by the write command is assigned to or included in the first storage apparatus 140 or the second storage apparatus 150. When the storing area corresponding to LBA is assigned to or included in the second storage apparatus 150, it can be determined that the second storage apparatus 150 is to be accessed, at operation S8603. Conversely, when the storing area corresponding to LBA is assigned to or included in the first storage apparatus 140, it can be determined that the first storage apparatus 140 is to be accessed.

However, as discussed above, when the storing area corresponding to a particular LBA is assigned to or included in the first storage apparatus 140, it can be determined whether the corresponding LBA information is included in a location information mapping list. The location information mapping list can include access frequencies corresponding to LBAs assigned to the first storage apparatus 140, such that the location information mapping list can be used as a mapping list to move one or more LBAs with a relatively high access frequency from the first storage apparatus 140 to the second storage apparatus 150.

In a case where the access frequency represents an access frequency according to the read command and/or the write command, a method of performing a write command will be described with reference to FIG. 7.

Figure 7:
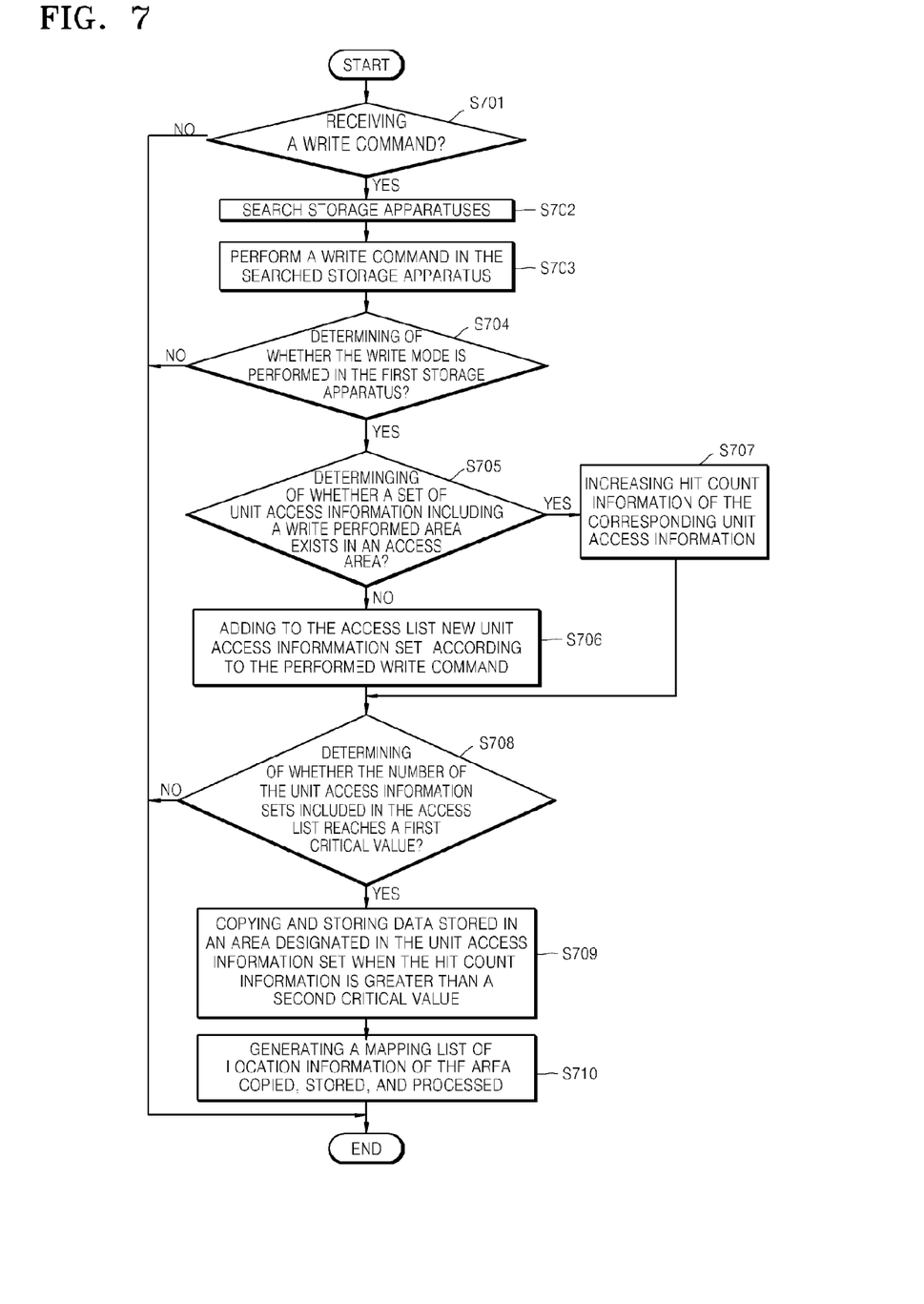
FIG. 7 illustrates a method of performing a write command in accordance with various embodiment.

Since operations S701-S703 of FIG. 7 may be similar to operations S601-S603 of FIG. 6, detailed descriptions thereof will be omitted.

Referring to FIG. 7, when a write command is performed at operation S703, it is determined whether the storage apparatus where the write command is performed is the first storage apparatus at operation S704.

When the storage apparatus where the write command is to be performed is the first storage apparatus at operation S704, it can be determined that a unit access information set exists or is included in the access list at operation S705. The unit access information set may include access area or storing area corresponding to the sector number information and one or more LBA information designated by the write command performed.

When the unit access information set does not exist or is not included in the access list at operation S705, a new unit access information set corresponding to the write command can be created and added to the access list at operation S706. That is, the new unit access information set can be generated to include a hit count information field set as an initial value of, for example, one (1), and LBA information and sector number information designated (or to be designated, determined, or assigned) by the write command.

When the unit access information set exists or is included in the access list at operation S705, the hit count information of the corresponding unit access information set can be increased at operation S707. That is, the hit count information of the unit access information set including an access area (or storing area) according to the sector number information and the LBA designated according to the write command can be increased by a number or a unit step, for example, one (1).

When the operation S706 or S707 is performed, it can be determined whether the number of the unit access information sets included in the access list is greater than a first critical value at operation S708. The first critical value, or threshold value, can mean a predetermined number of different unit access information sets are included in the access list. The first critical value may be determined according to design characteristics of the data storage system, or may be set as an initial predetermined value according to a user preference.

When the number of the unit access information sets included in the access list does not reach or is not greater than the first critical value at operation S708, the operation may be terminated or a next operation may be performed according to a next command, according to a determination that the access list does not have a number of unit access information sets. In this case, the operation of determining the access frequency may not be performed, since it can be determined that it is too early to detect the access frequency or to compare the access frequency with another critical value, or since the number of the unit access information sets may not be enough to detect one or more access frequencies of corresponding unit access information sets of the access list.

When the number of the unit access information sets included in the access list reaches or is greater than the first critical value at operation S708, it can be determined at operation S709 whether the hit count information of one of the unit access information sets included in the access list reaches or is greater than a second critical value, and data stored in an access area (storing area) corresponding to or designated by the one unit access information set can be copied, stored, or transmitted to an access area (storing area) of the second storage apparatus of which access speed is faster than the first storage apparatus. The second critical value, or second threshold value, can mean the number of hit counts corresponding to a particular unit access information set. The second critical value may be determined according to design characteristics of the data storage system, or may be set as an initial predetermined value according to a user preference.

A mapping list representing location information of the access area (storing area) having the copied, stored or transmitted data can be created, changed or stored at operation S710. The location information mapping list may represent replacement of location information corresponding to the storing area of the first storage apparatus with location information corresponding to the storing area of the second storage apparatus. The mapping list may be stored in the memory 120-2 of the controller 120 (FIG. 1).

Figure 8:
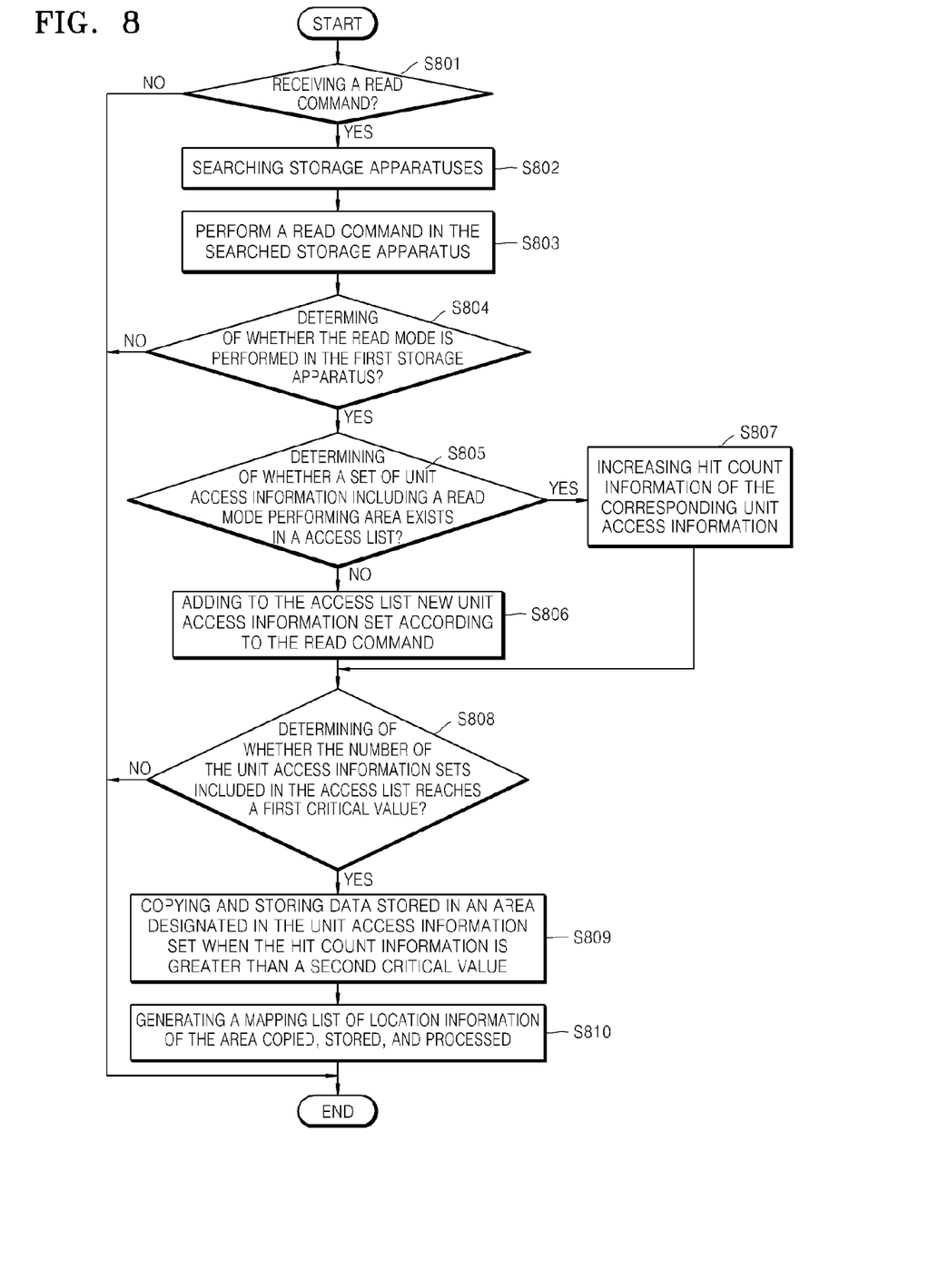
FIG. 8 illustrates a method of managing a data storing location in a read mode in accordance with various embodiments.

FIG. 8 illustrates a method of managing a data storing location in a read mode according to various embodiments.

Referring to FIGS. 1 and 8, when a command is generated or transmitted from the host apparatus 110 to the controller 120, the CPU 120-1 of the controller 120 can analyze the command to determine whether the received command is a write command or a read command at operation S801.

When the received command is a read command at operation S801, the CPU 120-1 can search one or more storage apparatuses assigned with one or more LBAs according to the sector number information and the LBA information designated by the read command at operation S802. Since an operation of searching the one or more storage apparatuses of FIG. 8 is similar to the search operations S602 and S702 of FIGS. 6 and 7, respectively, a detailed description thereof will be omitted.

Referring to FIG. 8, data can be read from an access area (storing area) designated by the read command in the searched storage apparatus at operation S803.

When the read command is performed at operation S803, it can be determined whether the storage apparatus in which a read mode is performed according to the read command is the first storage apparatus at operation S804.

When the read command is performed in the first storage apparatus at operation S804, it can be determined whether the unit access information set including the access area according to the sector number information and LBA information designated by the performed read command exists or is included in the access list at operation S805.

When the unit access information set including the access area according to the sector number information and LBA information designated by the performed read command does not exist or is not included in the access list at operation S805, a new unit access information set based on the read command can be added to the access list at operation S806. That is, the new unit access information set can include the sector number information and LBA information of the read command and hit count information of an initial value set as, for example, one (1). The access list can be changed or modified according to the new unit access information set.

When the unit access information set including the access area according to the sector number information and LBA information designated by the performed read command exists or is included in the access list at operation S805, the hit count information of the corresponding unit access information set can be increased by a unit step (value or number), for example, one (1) at operation S807.

When operation S806 or S807 is performed, it can be determined whether the number of the unit access information sets included in the access list reaches or is greater than a critical value at operation S808.

When the number of the unit access information sets included in the access list does not reach or is not greater than a critical value at operation S808, the method may be terminated, since it can be determined that it is too early to detect the access frequency or to compare the access frequency with another critical value, or since the number of the unit access information sets may not be enough to detect one or more access frequencies of corresponding unit access information sets of the access list.

When the number of the unit access information sets included in the access list reaches or is greater than a first critical value at operation S808, it can be determined whether the hit count information of one of the unit access information sets of the access list reaches or is greater than a second critical value. If so, data stored in the access area (storing area) of the first storage apparatus corresponding to the unit access information set can be copied, stored, or transmitted to an access area (storing area) of the second storage apparatus where data is typically not stored or where an area is available to store data, at operation S809.

A location information mapping list can be generated to represent an area storing the data at operation S810. Here, the location information mapping list can represent a list to replace location information of the storing area of the first storage apparatus with location information of the storing area of the second storage apparatus. The mapping list can be stored in the memory 120-2 of the controller 120 (FIG. 1).

The mapping list can be used to access the storing area according to a next command corresponding to the storing area.

As described herein, the data storage system of FIG. 1 may have a hard disk drive as the first storage apparatus 140, and the second storage apparatus 150 may be installed inside the hard disk drive. However, it is understood that other types and combinations of known or later developed storage apparatuses may be used without departing from the principles and spirit of the present disclosure.

Figure 9A:
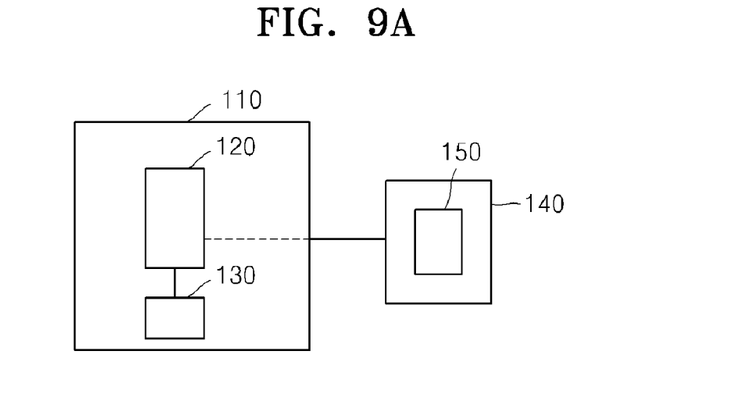
FIGS. 9A to 9C illustrate various exemplary combinations of the elements of FIG. 1.
Figure 9B:
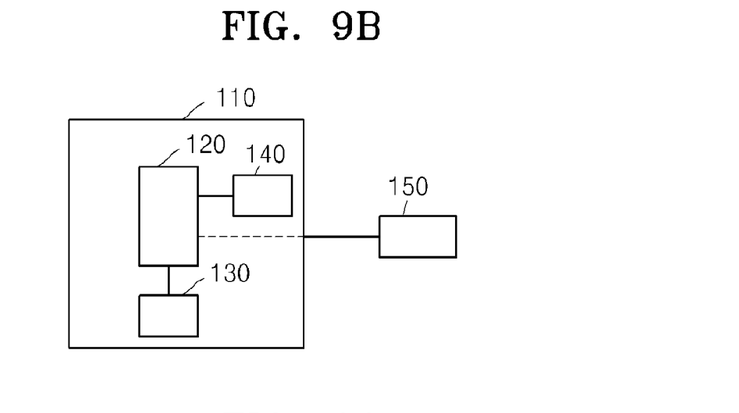
Figure 9C:
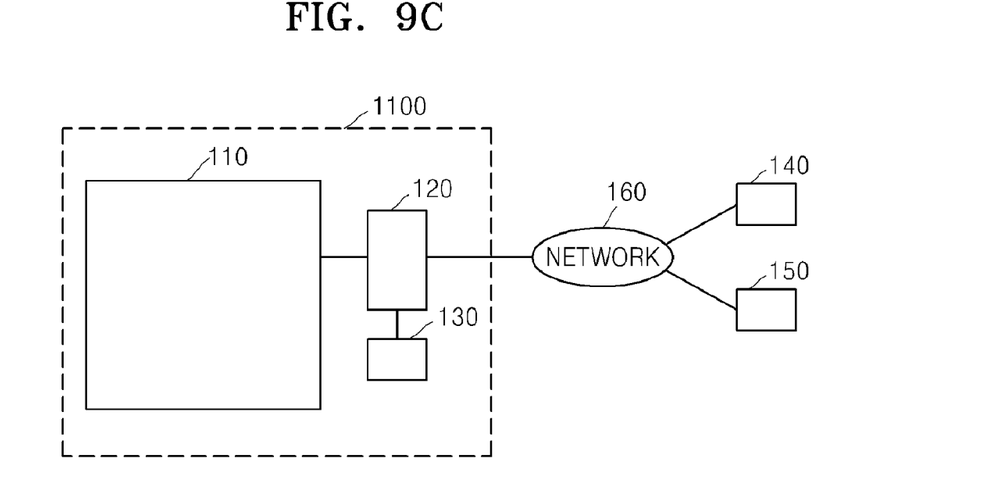

FIGS. 9A to 9C illustrate various exemplary combinations of elements of FIG. 1. For example, it is possible that the controller 120 and access list generating unit 130 can be installed within the host apparatus 110, and the second storage apparatus 150 can be installed within the first storage apparatus 140, as illustrated in FIG. 9A. It is also possible that the first storage apparatus 140 can be installed within the host apparatus 110 and the second storage apparatus can be detachably connected to the host interface 110 using a communication terminal or line, such as USB, or a wireless communication terminal, as illustrated in FIG. 9B. It is also possible that either one or both of the first and second storage apparatuses 140, 150 could be detachably connected to the controller 120 or host apparatus a distance away via a wired or wireless connection terminal. In addition, either one or both of the first and second storage apparatuses 140, 150 may be installed to communicate with the controller 120 through wired or wireless network 160, for example, as illustrated in FIG. 9C. It is to be noted that although a few example combinations of elements have been illustrated in FIGS. 9A to 9C, it is understood that other combinations of elements may be also used without departing from the principles and spirit of the present disclosure.

Figure 10:
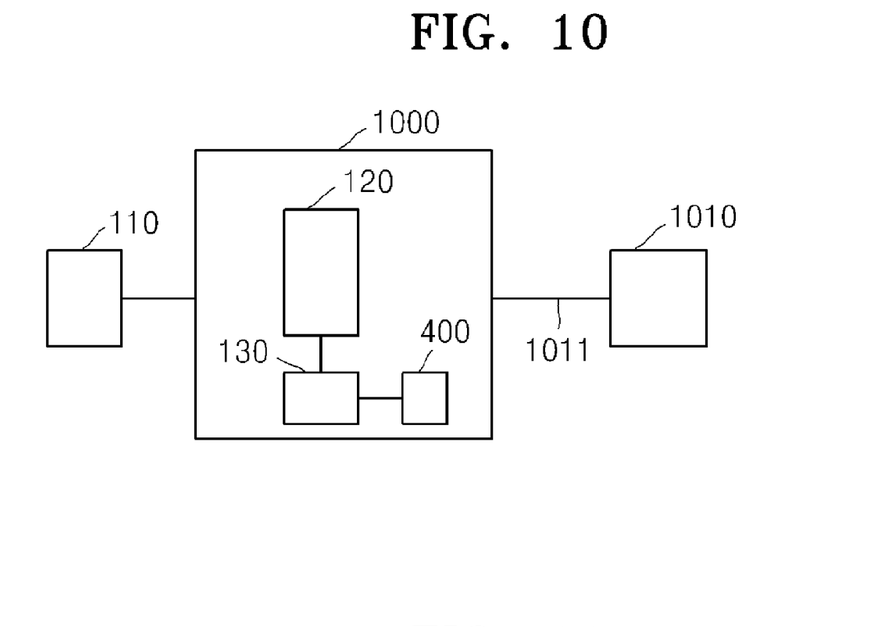
FIGS. 10 and 11 illustrate a data storage system having a display device, in accordance with various embodiments.
Figure 11:
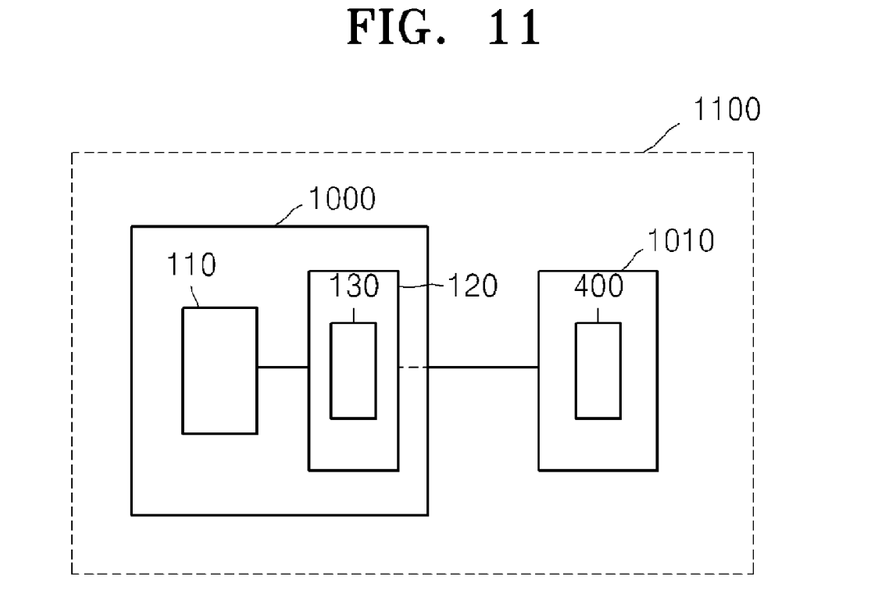

FIGS. 10 and 11 illustrate a data storage system having a display device, in accordance with various embodiments. Here, a display device 1010 can be implemented to communicate with the data storage system 1000 through a wired or wireless communication line 1011 to enable a user to view and/or change information regarding the storing areas, such as access lists, threshold levels, and/or other characteristics of the data storage system 1000. The data storage system 1000 can generate a signal representing a screen corresponding to the information as a user interface. The user can view or change the information through the user interface corresponding to the screen. In this regard, it is possible that the data storage system 1000 can include the host apparatus 110, and the display device 1010 can be installed together with the data storage system 1000 within a single housing body 1100, as illustrated in FIG. 11, although other combinations could also be used.

The disclosed subject matter can be implemented as a method, an apparatus, and a system. The disclosed subject matter can also be embodied as computer-readable codes on a computer-readable medium, and can be implemented as program code segments to perform operations necessary to the respective elements of the present general inventive concept. The computer-readable medium can include a computer-readable recording medium and a computer-readable transmission medium. The computer-readable recording medium can be any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the disclosed subject matter can be easily construed by programmers skilled in the art to which the present disclosure pertains.

Although a few embodiments of the present disclosure have been illustrated and described, it will be appreciated by those skilled in the art that changes may be made in these embodiments without departing from the principles and spirit of the present disclosure, the scope of which is defined in the appended claims and their equivalents.

What is claimed is:

1. A method, comprising:
    accumulating an access count for each of a plurality of storage areas in a first memory in relation to a total number of host access commands executed to transfer data between each said storage area and a host device;
    generating a storage area count in relation to a total number of the storage areas in said plurality having at least one executed access command; and
    copying the data in a selected storage area of said plurality of storage areas to a second memory responsive to the associated accumulated access count for the selected storage area exceeding a first threshold value, and responsive to the storage area count exceeding a second threshold value.

2. The method of claim 1, further comprising:
    comparing the storage area count to the second threshold; and
    comparing the associated accumulated access count for the selected storage area to the first threshold responsive to the storage are count exceeding the second threshold, wherein no data are copied if the storage area count is less than the second threshold.

3. The method of claim 1, in which each storage area comprises a plurality of data blocks each having an associated logical address, all of the data blocks in each storage area transferred during at least one of the executed access commands.

4. The method of claim 1, in which each storage area comprises a plurality of data blocks accessed by a different one of a plurality of software applications executing on the host device.

5. The method of claim 1, in which each of the plurality of storage areas comprises a different total number of data blocks each having a unique logical block address, wherein the total number of blocks in said plurality of storage areas is less than the total number of blocks in the first memory.

6. The method of claim 1, further comprising generating a table in a third memory with a plurality of entries, each entry associated with a selected one of the storage areas and including a first value indicative of a first logical block address for a first sequential block in said storage area, a second value indicative of a total number of consecutive blocks following the first sequential block, and a third value indicative of the associated accumulated access count for executed access commands involving at least one of the blocks in the storage area.

7. The method of claim 1, in which the copying the data in a selected storage area comprises:
reassigning a logical block address included in the selected storage area of the first memory to correspond to the second memory.

8. The method of claim 1, further comprising:
generating an access list to represent the accumulated access counts for the respective plurality of data storage areas; and
incrementing the accumulated access counts in the access list responsive to the execution of each of the access commands.

9. The method of claim 1, in which none of the data in the plurality of storage areas are copied to the second memory responsive to the storage area count being less than the second threshold value.

10. The method of claim 1, in which the first memory is a relatively slower non-volatile memory, and the second memory is a relatively faster non-volatile memory.

11. The method of claim 1, in which the access commands are characterized as read commands in which data from the respective storage areas are transferred to the host device, and write commands in which data are stored in the respective storage areas from the host device.

12. The method of claim 1, in which the first memory is characterized as a disc memory and the second memory is characterized as a semiconductor memory.

13. A data storage system, comprising:
a first memory;
a second memory; and
a controller adapted to execute host access commands to transfer data between each of a plurality of storage areas in the first memory and a host device, the controller further adapted to accumulate an access count for each of the plurality of storage areas in the first memory in relation to a total number of host access commands executed therefor, to generate a storage area count in relation to a total number of active storage areas each having at least one executed access command within a selected time interval, and to migrate the data in a selected storage area of said plurality of storage areas to the second memory responsive to the associated accumulated access count for the selected storage area exceeding a first predetermined threshold value, and responsive to the storage area count exceeding a second predetermined threshold value.

14. The data storage system of claim 13, in which the controller is further adapted to update logical address information associated with the migrated data so that future access commands associated therewith are transferred between the host device and the second memory.

15. The data storage system of claim 13, in which the controller is further adapted to compare the storage area count to the second threshold value, and to not migrate any data from the first memory to the second memory responsive to the storage area count being less than the second threshold value.

16. The data storage system of claim 13, in which the first memory has a relatively slower response level and the second memory has a relatively faster response level.

17. The data storage system of claim 13, in which the first memory is a disc based memory and the second memory is a solid-state semiconductor memory.

18. The data storage system of claim 13, in which each storage area comprises a plurality of data blocks each having an associated logical address, all of the data blocks in each storage area transferred during at least one of the executed host access commands.

19. The data storage system of claim 13, in which each storage area comprises a plurality of data blocks accessed by a different one of a plurality of software applications executing on the host device.

20. The data storage system of claim 13, in which each of the plurality of storage areas comprises a different total number of data blocks each having a unique logical block address, wherein the total number of blocks in said plurality of storage areas is less than the total number of blocks at the first memory.

21. The data storage system of claim 20, in which the controller is further adapted to generate a table in a third memory with a plurality of entries, each entry associated with a selected one of the storage areas of the first memory and including a first value indicative of a first logical block address for a first sequential block in said storage area, a second value indicative of a total number of consecutive blocks following the first sequential block, and a third value indicative of the associated accumulated access count for executed access commands involving at least one of the blocks in the storage area.

22. A method comprising:
receiving addresses of data sets to be read from a first memory unit responsive to a plurality of read commands;
generating a list comprising a total number of data sets having at least one associated read command from said plurality and a total accumulated count of said read commands for each data set; and
copying the data set associated with a selected address from the first memory unit to a second memory unit responsive to the total number of data sets exceeding a first predetermined threshold value and the total accumulated count for the selected address exceeding a second predetermined threshold.

23. The method of claim 22, further comprising:
comparing the total number of data sets to the first predetermined threshold; and
comparing the total accumulated count for the selected address to the second predetermined threshold responsive to the total number of data sets exceeding the first predetermined threshold, wherein no data sets are copied responsive to the total number of data sets falling below the first predetermined threshold.

24. The method of claim 22 in which each data set is associated with a different software application executed on a host device.

25. The method of claim 22, in which each of the data sets comprises a different total number of data blocks each having a unique logical block address, wherein the total number of blocks in said data sets is less than the total number or blocks in the first memory unit.

26. The method of claim 22, in which the first memory unit is a relatively slower memory and the second memory unit is a relatively faster memory.

* * * * *